US012051346B2

(12) United States Patent
Yim et al.

(10) Patent No.: US 12,051,346 B2
(45) Date of Patent: Jul. 30, 2024

(54) TEST METHOD, TEST APPARATUS AND DISPLAY DEVICE

(71) Applicant: Samsung Display Co., Ltd., Yongin-Si (KR)

(72) Inventors: Hyungwoo Yim, Hwaseong-si (KR); Seyun Kim, Hwaseong-si (KR); Huisu Kim, Busan (KR); Hakmo Choi, Seoul (KR); Seungho Park, Suwon-si (KR); Kyung-Sik Joo, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/882,663

(22) Filed: Aug. 8, 2022

(65) Prior Publication Data

US 2023/0252921 A1 Aug. 10, 2023

(30) Foreign Application Priority Data

Feb. 9, 2022 (KR) ........................ 10-2022-0016949

(51) Int. Cl.
*G09G 3/00* (2006.01)
*G09G 3/20* (2006.01)

(52) U.S. Cl.
CPC ........... *G09G 3/006* (2013.01); *G09G 3/2096* (2013.01); *G09G 2320/0233* (2013.01); *G09G 2330/10* (2013.01); *G09G 2360/16* (2013.01)

(58) Field of Classification Search
CPC ................. G09G 3/006; G09G 3/2096; G09G 2320/0233; G09G 2330/08; G09G 2330/10; G09G 2330/12; G09G 2360/16
See application file for complete search history.

(56) References Cited

U.S. PATENT DOCUMENTS 8,837,853 B2 * 9/2014 Tachi ................... H04N 23/843
382/263
11,386,832 B1 * 7/2022 Yoo ...................... G09G 3/2096

FOREIGN PATENT DOCUMENTS

KR 10-2175702 B1 11/2020

* cited by examiner

*Primary Examiner* — Gene W Lee
(74) *Attorney, Agent, or Firm* — Innovation Counsel LLP

(57) ABSTRACT

A test method includes generating first image data by imaging a display panel including pixels, generating boundary data by detecting a spot area in the display panel based on the first image data, generating second image data by deblurring the first image data with respect to a boundary area disposed at a boundary of the spot area based on the boundary data and generating correction data by setting a correction area including the boundary area based on the second image data.

9 Claims, 10 Drawing Sheets

TEST METHOD, TEST APPARATUS AND DISPLAY DEVICE

CROSS-REFERENCE TO RELATED APPLICATION(S)

This application claims priority under 35 USC § 119 to Korean Patent Application No. 10-2022-0016949 filed on Feb. 9, 2022, in the Korean Intellectual Property Office (KIPO), the entire disclosure of which is incorporated by reference herein.

BACKGROUND

1. Field

Embodiments relate to a display device. More particularly, embodiments relate to a test method configured to generate correction data with respect to a display panel included in the display device and a test apparatus performing the same. Also, embodiments relate to the display device configured to store the correction data.

2. Description of the Related Art

The display device is a device that displays an image for providing visual information to a user. Among display devices, an organic light emitting diode display has been recently attracted attention.

The display device may be manufactured using an inkjet process. During the inkjet process, $TiO_x$ material included in an ink may be deposited in inkjet nozzles included in an inkjet apparatus. For this reason, each of pixels included in the display device may have different luminance or spot.

An image displayed on the display device may be captured, and spot correction data may be generated based on the captured image, and spot correction which write the correction data to the display device may be performed to remove spots on the display device and improve luminance uniformity of the display device.

SUMMARY

Embodiment provides a test method configured to generate correction data correcting image quality of a display device.

Another embodiment provides a test apparatus performing the test method.

Further another embodiment provides a display device storing the correction data.

A test method according to an embodiment may include generating first image data by imaging a display panel including pixels, generating boundary data by detecting a spot area in the display panel based on the first image data, generating second image data by deblurring the first image data with respect to a boundary area disposed at a boundary of the spot area based on the boundary data and generating correction data by setting a correction area including the boundary area based on the second image data.

In an embodiment, the generating the first image data may include performing a boundary image processing on a captured initial image data.

In an embodiment, the generating the boundary data may include obtaining a luminance profile of the display panel along a direction perpendicular to an extension direction of the spot area.

In an embodiment, the generating the boundary data may include obtaining a change amount of the luminance profile based on the luminance profile.

In an embodiment, the generating the boundary data may include detecting the boundary of the spot area based on the change amount of the luminance profile.

In an embodiment, the display panel may further include a non-boundary area disposed adjacent to the boundary area.

In an embodiment, the generating the second image data further may include blurring the first image data with respect to the non-boundary area based on the boundary data.

In an embodiment, the pixels may be positioned in the correction area and include boundary pixels disposed in the boundary area, and the correction area may include a sub-correction area corresponding to each of the boundary pixels.

In an embodiment, the generating the correction data may include calculating a correction value corresponding to the sub-correction area.

A test apparatus according to an embodiment may include an imaging device generating first image data by imaging a display panel including pixels, a detector generating boundary data by detecting a spot area of the display panel based on the first image data, an image processor generating second image data by deblurring the first image data with respect to a boundary area positioned at a boundary of the spot area based on the boundary area, an area setter setting a correction area including the boundary area based on the second image data, and a calculator generating correction data with respect to the correction area based on the second image data.

In an embodiment, the detector may generate the boundary data by performing a boundary image processing on a captured initial image data.

In an embodiment, the detector may obtain a luminance profile of the display panel along a direction perpendicular to an extension direction of the spot area.

In an embodiment, the detector may obtain a change amount of the luminance profile based on the luminance profile.

In an embodiment, the detector may detect the boundary of the spot area based on the change amount.

In an embodiment, the pixels may be positioned in the correction area and include boundary pixels disposed in the boundary area, and the correction area may include a sub-correction area corresponding to each of the boundary pixels.

In an embodiment, the calculator may generate the correction data by calculating a correction value corresponding to the sub-correction area.

In an embodiment, the display panel may further include a non-boundary area disposed adjacent to the boundary area.

In an embodiment, the image processor may blur the first image data with respect to the non-boundary area based on the boundary data.

A display device according to an embodiment may include a display panel including pixels, a data driver providing data signals, a gate driver providing gate signals, a controller controlling the data driver and the gate driver, and a correction data memory storing pixel correction data to correct each of boundary pixels positioned in a boundary of a predetermined area among the pixels included in the display panel and image quality correction data to correct the entire display panel, and the controller may include a data corrector generating output image data by correcting input image data based on the pixel correction data and the image quality correction data.

In a test method according to embodiments of the present inventive concept, the test method may generate correction data to correct the spots of the display panel. The correction data may be applied to the display panel to remove the spots on the display panel. Accordingly, the image quality of the display panel may be improved.

Also, the correction data may include correction value for each of the pixels positioned in the boundary area of the spot. Accordingly, it is possible to perform detailed correction of the display panel, and the image quality of the display panel may be improved.

DETAILED DESCRIPTION OF THE EMBODIMENTS

Figure 1:
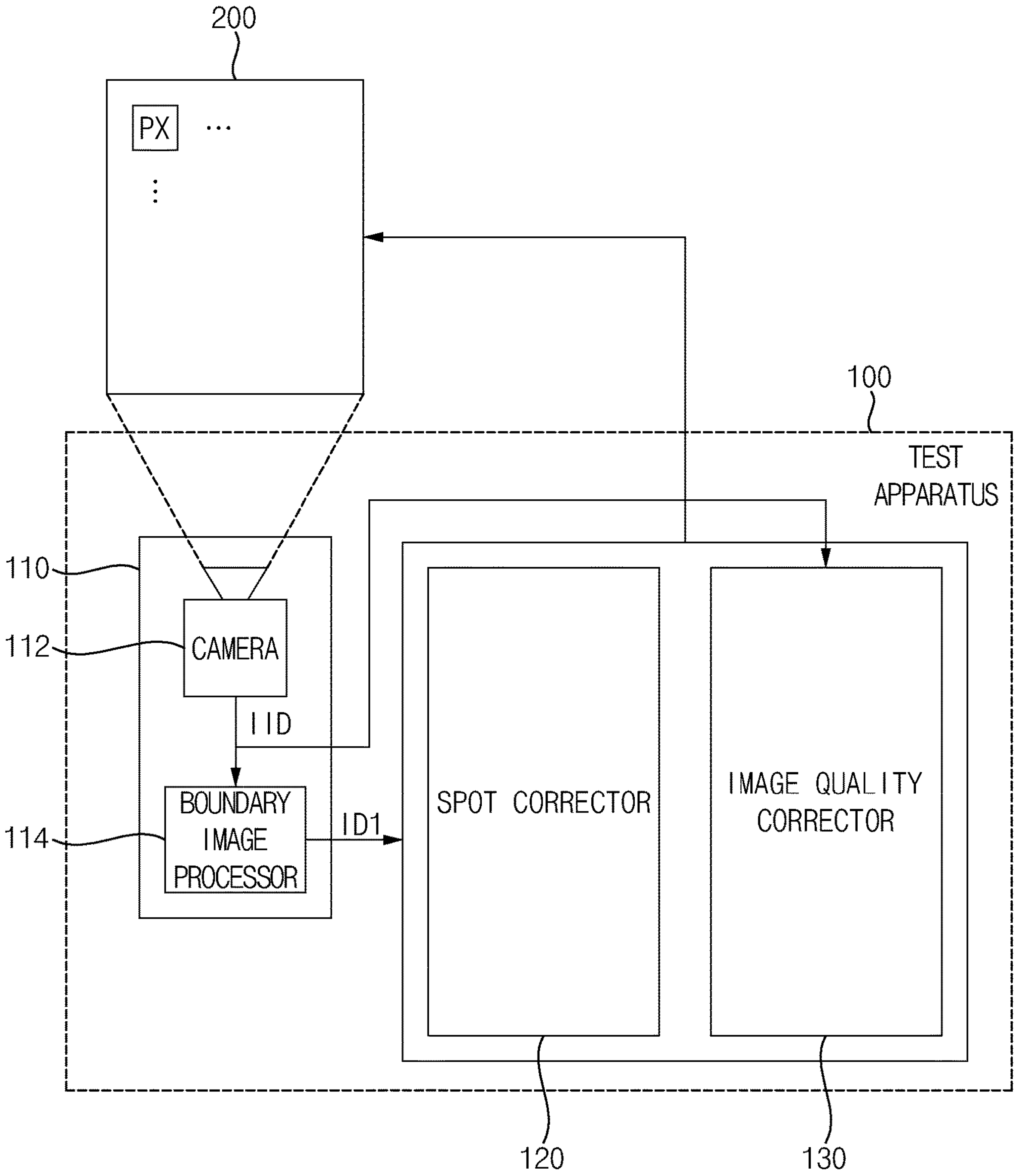
FIG. 1 is a block diagram illustrating a test apparatus according to embodiments of the present inventive concept.

Hereinafter, display devices in accordance with embodiments will be described in more detail with reference to the accompanying drawings. The same reference numerals are used for the same components in the drawings, and redundant descriptions of the same components will be omitted.

Figure 2:
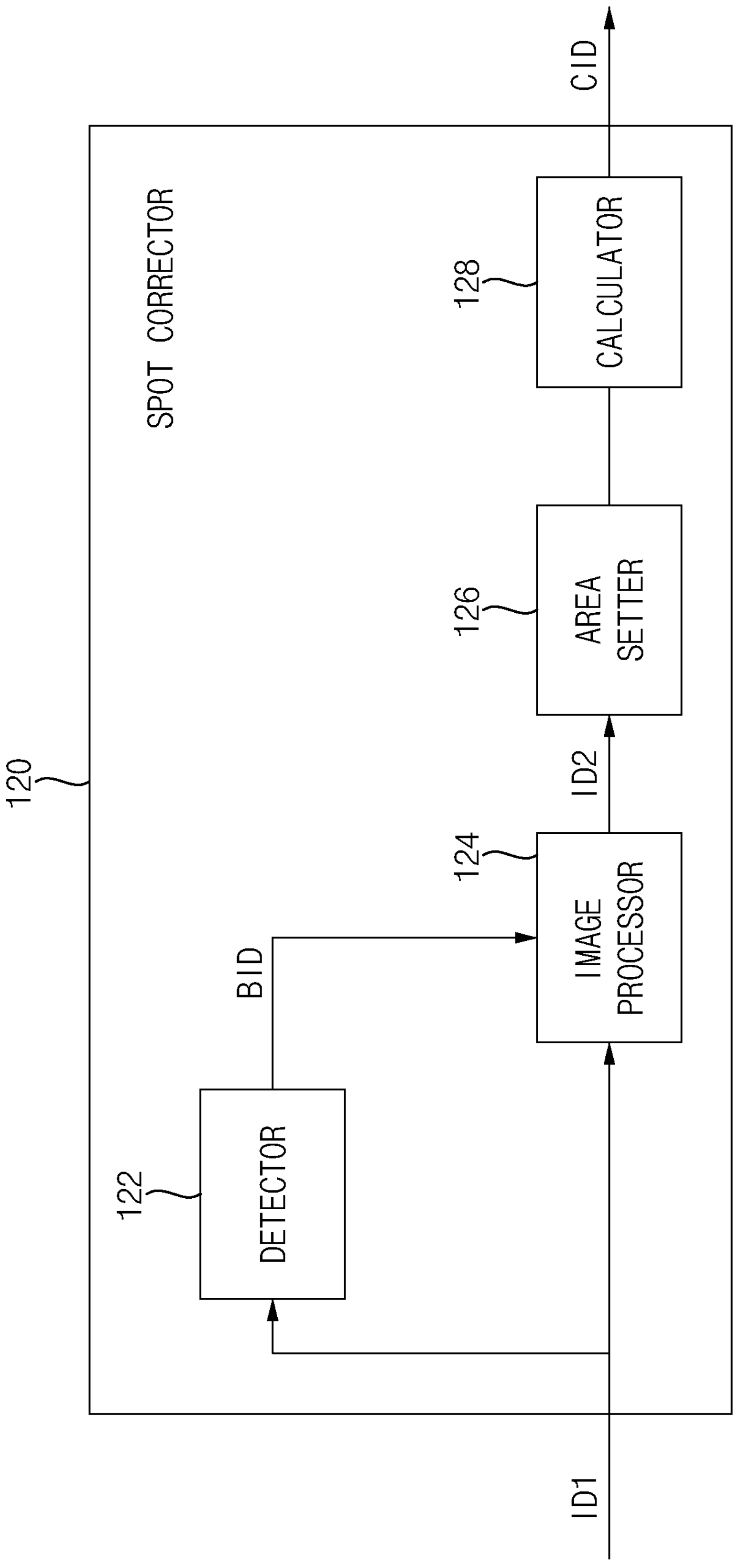
FIG. 2 is a block diagram illustrating an example of a spot corrector included in the test apparatus of FIG. 1.
Figure 3:
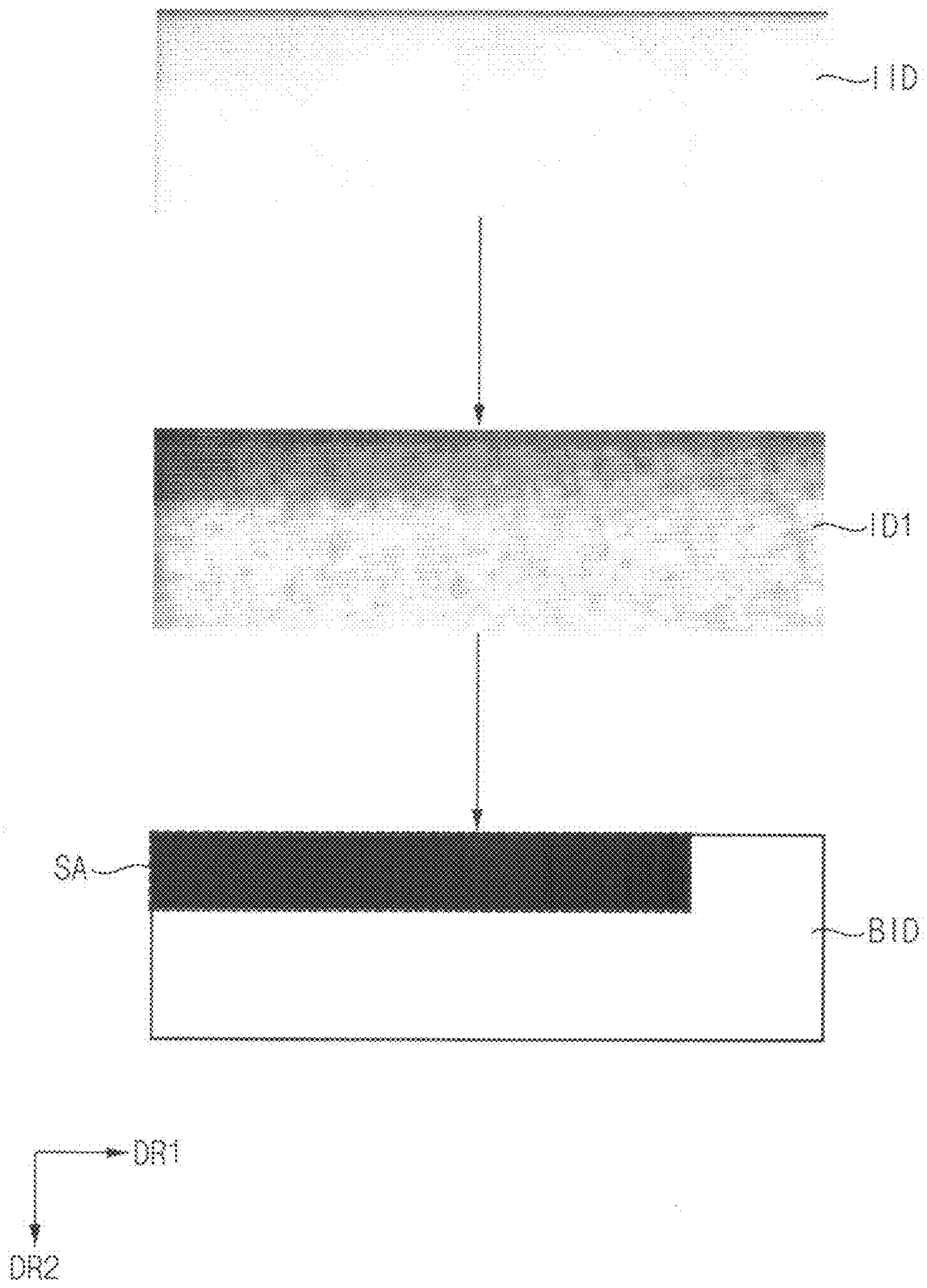
FIG. 3 is a diagram illustrating an example of each of initial image data, first image data, and boundary data.
Figure 4:
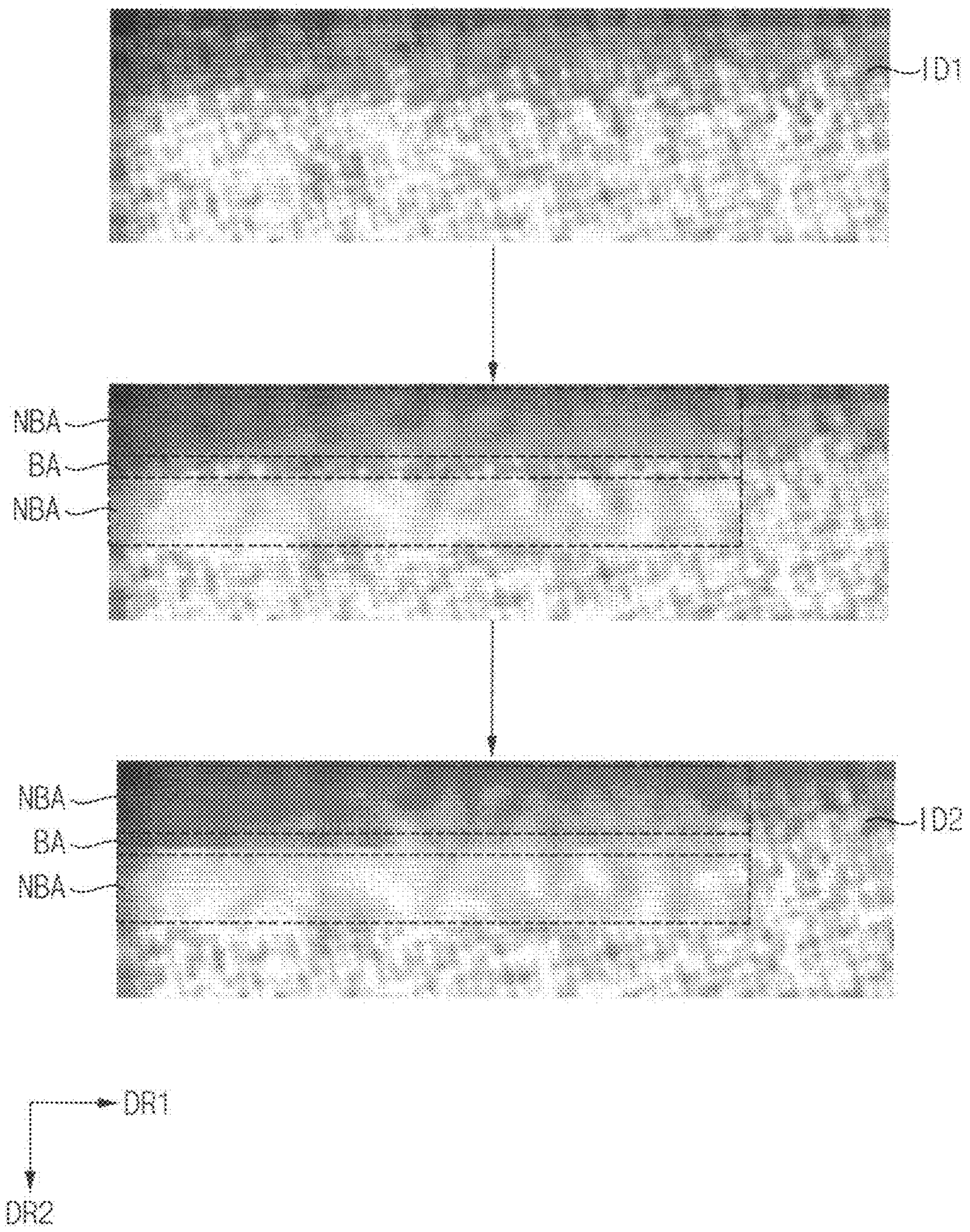
FIG. 4 is a diagram illustrating an example of each of first image data and second image data.
Figure 5:
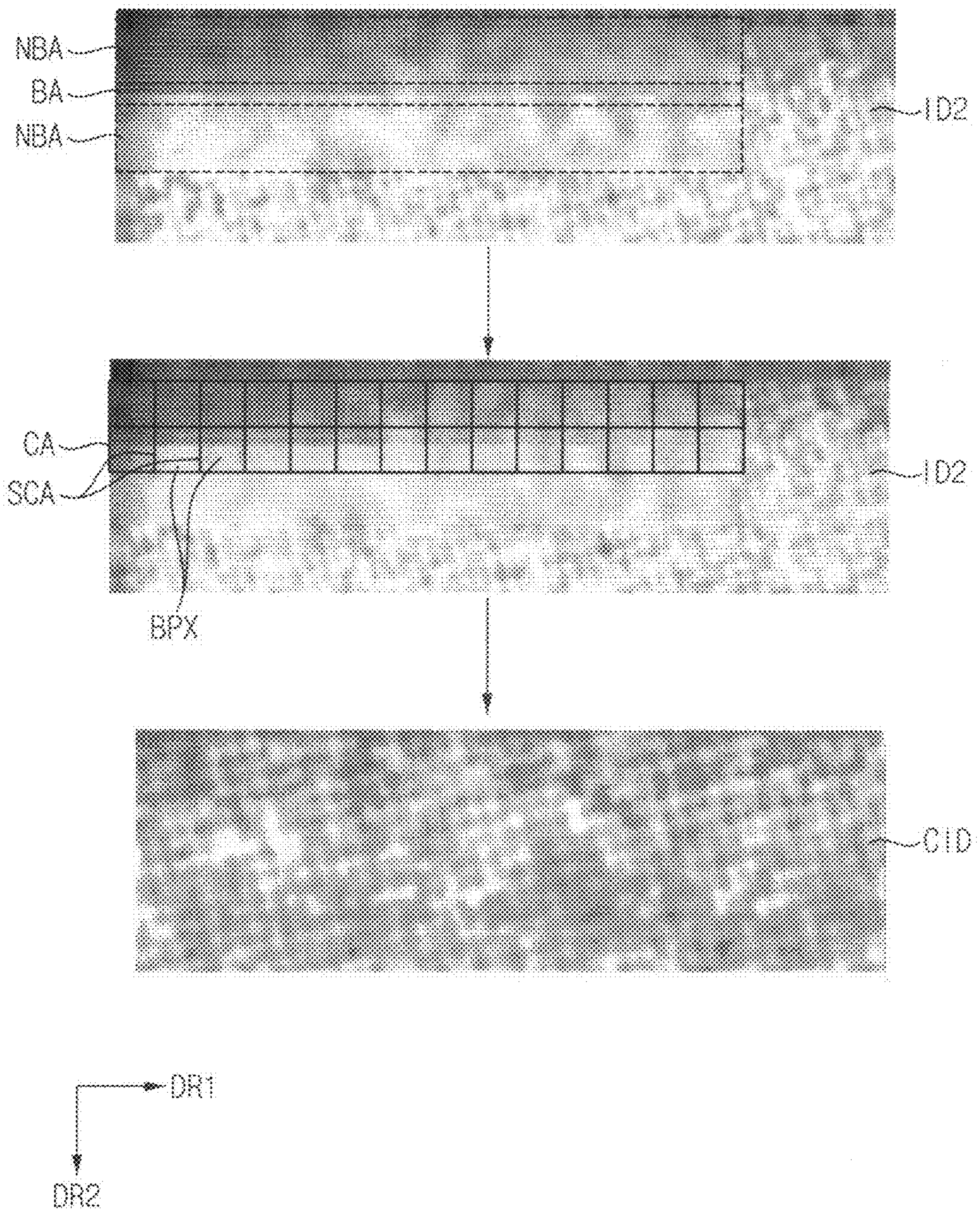
FIG. 5 is a diagram illustrating an example of each of second image data and correction data.

FIG. 1 is a block diagram illustrating a test apparatus according to embodiments of the present inventive concept. FIG. 2 is a block diagram illustrating an example of a spot corrector included in the test apparatus of FIG. 1. FIG. 3 is a diagram illustrating an example of each of initial image data, first image data, and boundary data. FIG. 4 is a diagram illustrating an example of each of first image data and second image data. FIG. 5 is a diagram illustrating an example of each of second image data and correction data.

Referring to FIGS. 1 and 2, a test apparatus 100 according to embodiments of the present inventive concept may generate correction data for a display panel 200. In an embodiment, the test apparatus 100 may perform a test process including spot correction and image quality correction on the display panel 200. The test apparatus 100 may include an imaging device 110, a spot corrector 120, and an image quality corrector 130. The spot corrector 120 may include a detector 122, an image processor 124, an area setter 126, and a calculator 128. The display panel may include a plurality of pixels PX.

Referring to FIGS. 1 to 3, the imaging device 110 may include a camera 112 and a boundary image processor 114. The camera 112 included in the imaging device 110 may obtain initial image data IID by imaging an image displayed on the display panel 200 and provide the initial image data IID to the boundary image processor 114. In an embodiment, the camera 112 included in the imaging device 110 may be a charge coupled device (CCD) camera or a complementary metal oxide semiconductor (CMOS) camera. However, the present inventive concept is not limited thereto.

The boundary image processor 114 included in the imaging device 110 may perform boundary image processing on the initial image data IID. The boundary image processor 114 may generate first image data ID1 by performing the boundary image processing on the captured initial image data IID. In the first image data ID1 on which the boundary image processing is performed, a spot portion may be displayed more clearly than other portions of the initial image data IID on the display panel 200. The spot portion may be a portion having a relatively low luminance in the display panel 200.

The detector 122 in the spot corrector 120 may detect a spot area SA of the display panel 200 based on the first image data ID1. The spot area SA may be an area in which the spot portion of the display panel 200 is positioned. The spot area SA may extend in a first direction DR1 as disclosed in FIG. 3. For example, the first direction DR1 may be an X-axis direction.

Specifically, the detector 122 may obtain a luminance profile of the display panel 200 in the second direction DR2. The second direction DR2 may be perpendicular to the first direction DR1. For example, when the first direction DR1 is an X-axis direction, the second direction DR2 may be a Y-axis direction. The detector 122 may obtain a change amount of the luminance profile based on the luminance profile. An area in which the change amount of the luminance profile is greater than a reference value may be a boundary of the spot area SA. Accordingly, the detector 122 may detect the boundary of the spot area SA based on the luminance profile and the change amount of the luminance profile. The detector 122 may generate boundary data BID based on the detected boundary of the spot area SA.

Referring to FIGS. 1 to 4, the image processor 124 may generate second image data ID2 based on the boundary data BID.

The display panel 200 may include a boundary area BA and a non-boundary area NBA. The boundary area BA may be positioned at a boundary of the spot area SA. The non-boundary area NBA may be disposed adjacent to the boundary area BA. The non-boundary area NBA may surround the boundary area BA.

The image processor 124 may deblur the first image data ID1 with respect to the boundary area BA. The image processor 124 may blur the first image data ID1 with respect to the non-boundary area NBA.

The boundary area BA may be displayed relatively clearly in the second image data ID2 than in the first image data ID1 through the blurring process and the deblurring process.

Referring to FIGS. 1 to 5, the area setter 126 may set a correction area CA based on the second image data ID2. The correction area CA may include the boundary area BA. For example, the correction area CA may include the boundary area BA and a portion of the non-boundary area NBA disposed adjacent to the boundary area BA. However, the present inventive concept is not limited thereto, and the correction area CA may include only the boundary area BA.

In an embodiment, the pixels PX may include boundary pixels BPX. The boundary pixels BPX may be located in the correction area CA. The boundary pixels BPX may be disposed in the boundary area BA. The correction area CA may entirely cover an area in which the boundary pixels BPX are disposed. Some portions of the boundary pixels BPX may not be disposed in the boundary area BA. That is, only a portion of the boundary pixels BPX may be disposed in the boundary area BA and remaining portions of the boundary pixels BPX may be disposed in the non-boundary area NBA. However, the present inventive concept is not limited thereto, and all the boundary pixels BPX may be disposed in the boundary area BA and may not be disposed in the non-boundary area NBA.

The correction area CA may include a plurality of sub-correction areas SCA. The sub-correction areas SCA may be set to correspond to each of the boundary pixels BPX. Each sub-correction area SCA may be set for each boundary pixel BPX.

The plurality of sub-correction areas SCA may form the correction area CA.

The calculator 128 may generate correction data CID for the correction area CA. The calculator 128 may calculate a correction value for each of the sub-correction areas SCA. That is, the calculator 128 may calculate the correction value for each of the pixels PX in the correction area CA. The calculator 128 may generate the correction data CID using the calculated correction values. Each of the pixels PX may be corrected using the correction data CID.

Correction for each of the pixels PX (e.g., spot correction) and correction for the entire display panel 200 (e.g., image quality correction) may be separately performed. The image quality corrector 130 may perform a test process including correction of the entire display panel 200 rather than correction of each of the pixels PX. The image quality corrector 130 may include a calculator 132, and the calculator may calculate a correction value for the entire display panel 200 based on the initial image data IID imaged by the imaging device 110. The image quality corrector 130 may generate image quality correction data by calculating the correction value, and may correct the image quality of the entire display panel 200.

Figure 6:
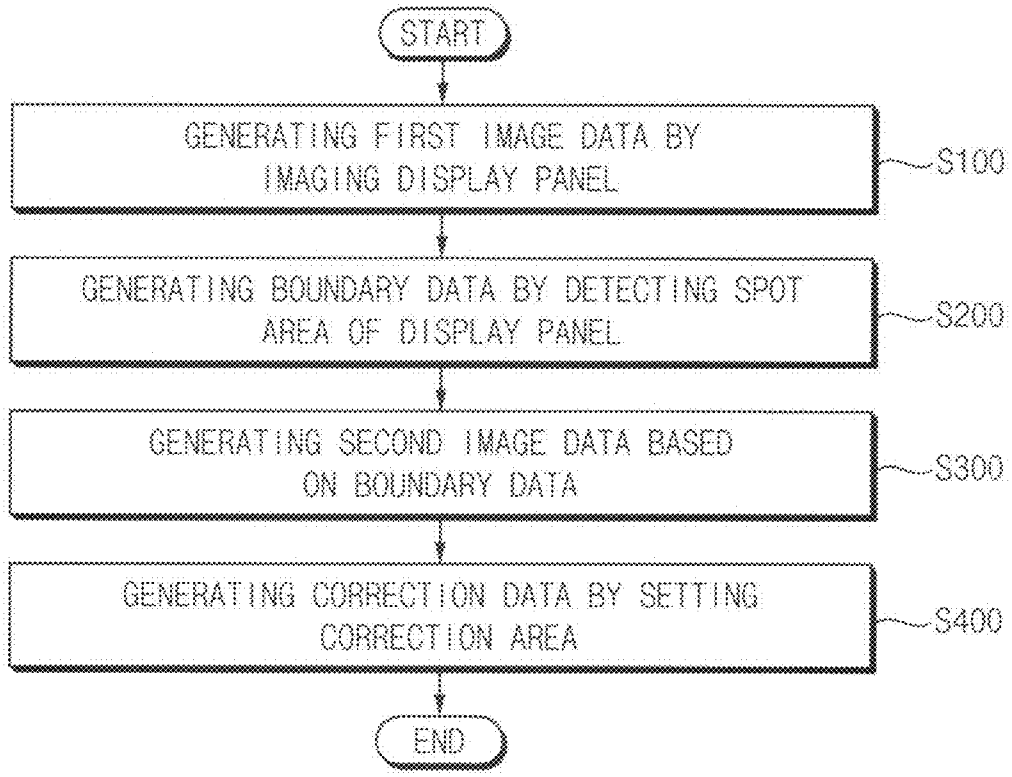
FIG. 6 is a flowchart illustrating a test method using the test apparatus of FIG. 1.
Figure 7:
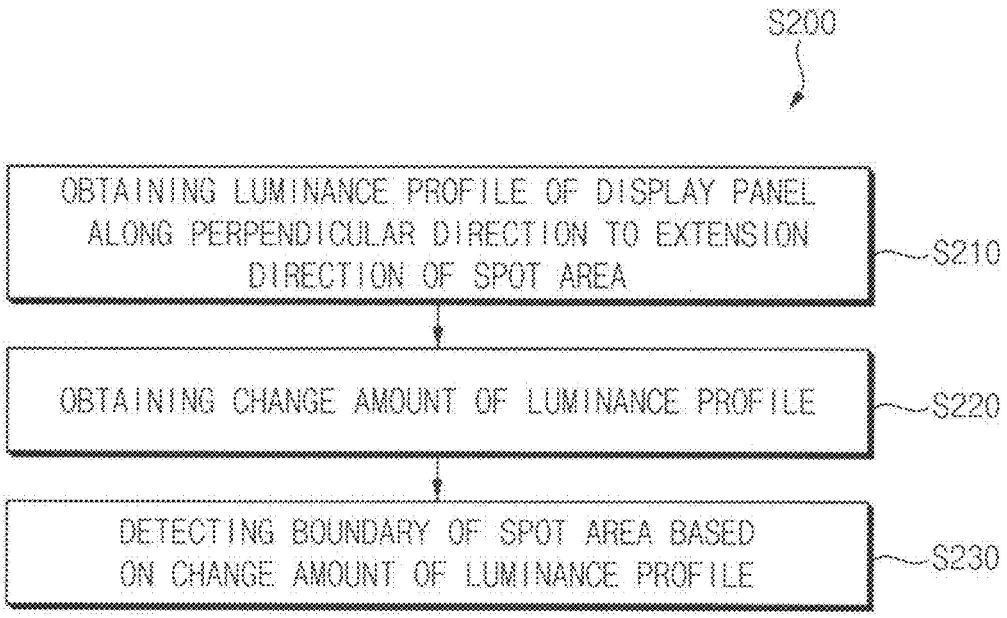
FIG. 7 is a flowchart illustrating a boundary data generation step included in the test method of FIG. 6.
Figure 8:
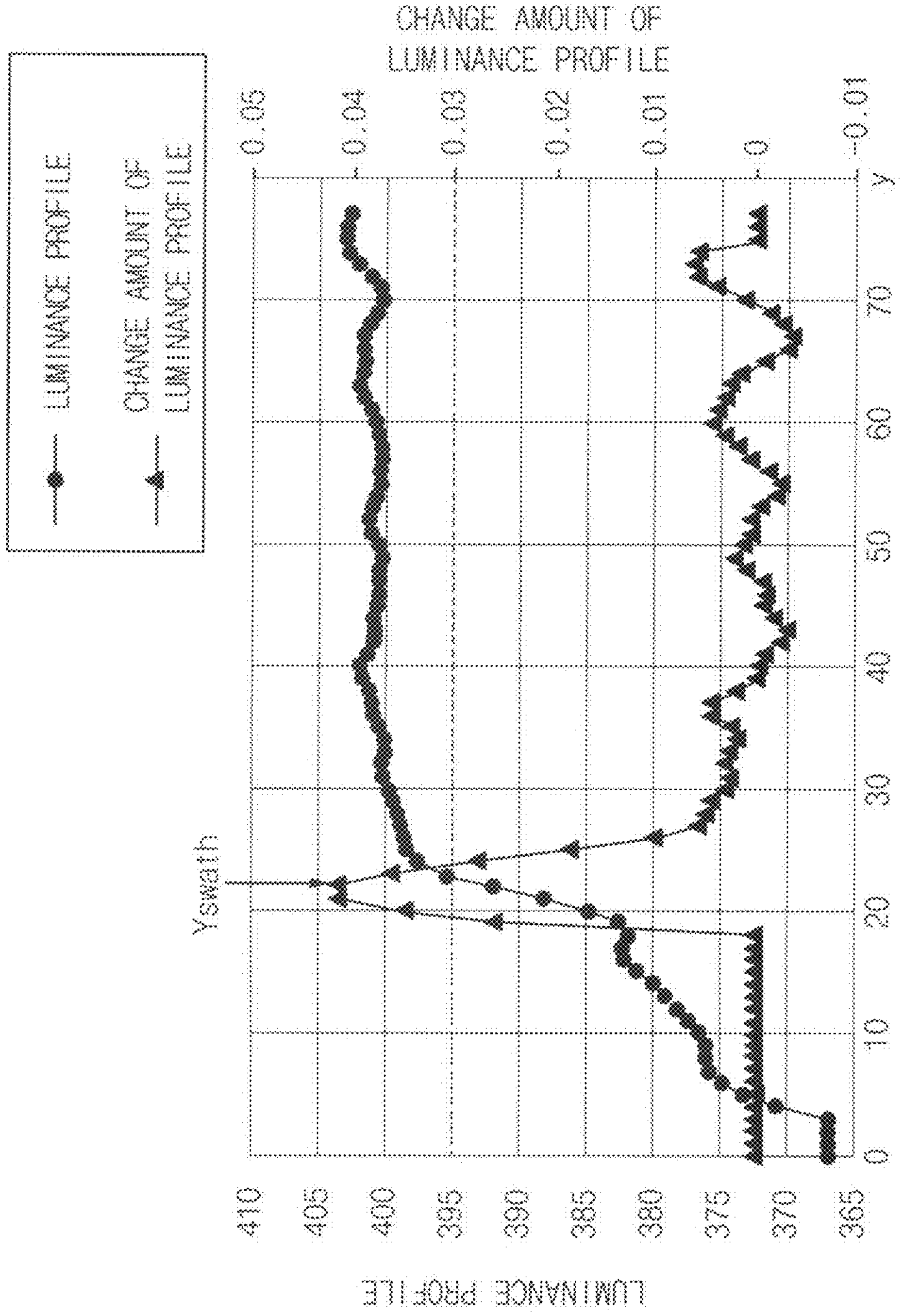
FIG. 8 is a graph illustrating a luminance profile of a display panel and a change amount of the luminance profile.

FIG. 6 is a flowchart illustrating a test method using the test apparatus of FIG. 1. FIG. 7 is a flowchart illustrating a boundary data generation step included in the test method of FIG. 6. FIG. 8 is a graph illustrating a luminance profile of a display panel and a change amount of the luminance profile.

For example, a test method according to FIG. 6 may be performed by the test apparatus 100 according to FIGS. 1 to 5. Accordingly, among a description of the test method described with reference to FIG. 6, the same portions as those of the test apparatus 100 described with reference to FIGS. 1 to 5 may be omitted.

Referring to FIGS. 1, 2, and 6, the test method according to embodiments of the present inventive concept may generate correction data for the display panel 200.

Referring to FIGS. 1, 2, 3, 6, and 7, the test method may generate first image data ID1 by imaging the display panel 200 (S100). The step of generating the first image data ID1 (S100) may use an imaging device 110. The imaging device 110 may include a camera 112 and a boundary image processor 114. The boundary image processor 114 included in the imaging device 110 may perform boundary image processing, and the imaging device 110 may generate the first image data ID1 based on the initial image data IID through the boundary image processing.

In an embodiment, the step of generating the first image data ID1 (S100) may display the spot portion of the display panel 200 clearly in the first image data ID1 than in the initial image data IID through the boundary image processing.

The test method may generate boundary data BID based on the first image data ID1 (S200). The step of generating the boundary data BID (S200) may detect a spot area SA of the display panel 200. The step of generating the boundary data BID (S200) may use a detector 122. The detector 122 may obtain a luminance profile and a change amount of the luminance profile (S210 and S220). The detector 122 may generate a graph based on the luminance profile and the change amount of the luminance profile.

Referring further to FIG. 8, the graph may illustrate the luminance profile and the change amount of the luminance profile. A Y-axis of the graph indicating the luminance profile may be a luminance value of each of the pixels PX measured along the second direction DR2. Accordingly, a portion having a relatively low luminance value may be the spot area SA. The Y-axis of the graph indicating the change amount may be the change amount of the luminance value of each of the pixels measured along the second direction DR2. For example, the Y-axis of the graph may be a change amount of the luminance value. Accordingly, an area in which the pixel having a large change amount is positioned may be a boundary of the spot area SA.

In the step of generating the boundary data BID (S200), the spot area SA and the boundary of the spot area SA may be detected through the graph, and the boundary data BID may be generated (S230).

Figure 9:
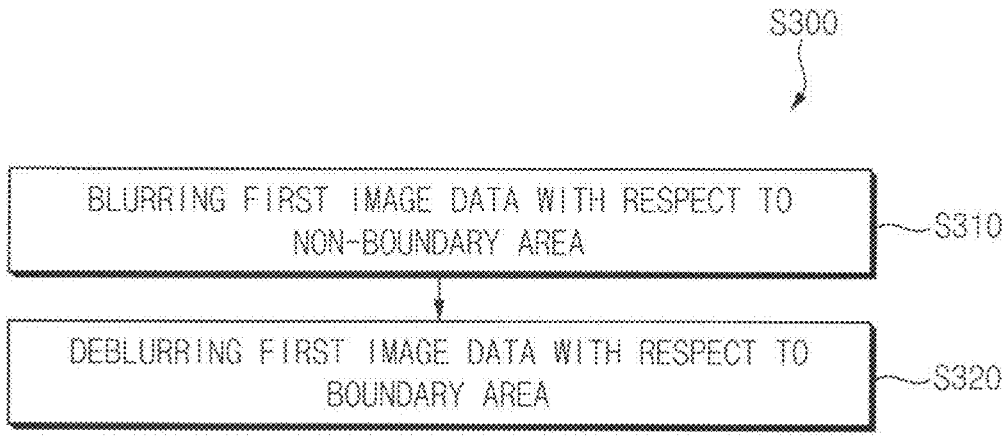
FIG. 9 is a flowchart illustrating a second image data generation step included in the test method of FIG. 6.

FIG. 9 is a flowchart illustrating a second image data generation step included in the test method of FIG. 6.

Referring to FIGS. 1, 2, 4, 6 and 9, the test method may generate the second image data ID2 based on the first image data ID1 and the boundary data BID. In the step of generating the second image data ID2 (S300), the second image data ID2 may be generated by blurring and deblurring the first image data ID1.

Specifically, the step of generating the second image data ID2 (S300) may use the image processor 124. The image processor 124 may set a boundary area BA and a non-boundary area NBA based on the boundary data BID. The image processor 124 may blur the first image data ID1 with respect to the non-boundary area NBA (S310) and may deblur the first image data ID1 with respect to the boundary area BA (S320). The image processor 124 may blur the non-boundary area NBA by applying a blurring filter.

A blurring process for the non-boundary area NBA and a deblurring process for the boundary area BA may be sequentially performed. However, the present inventive concept is not limited thereto, and the blurring process and the deblurring process may be performed simultaneously.

In an embodiment, the step of generating the second image data ID2 (S300) may display the boundary area BA of the display panel 200 clearly in the second image data ID2 than in the first image data ID1 through the blurring process and the deblurring process.

Figure 10:
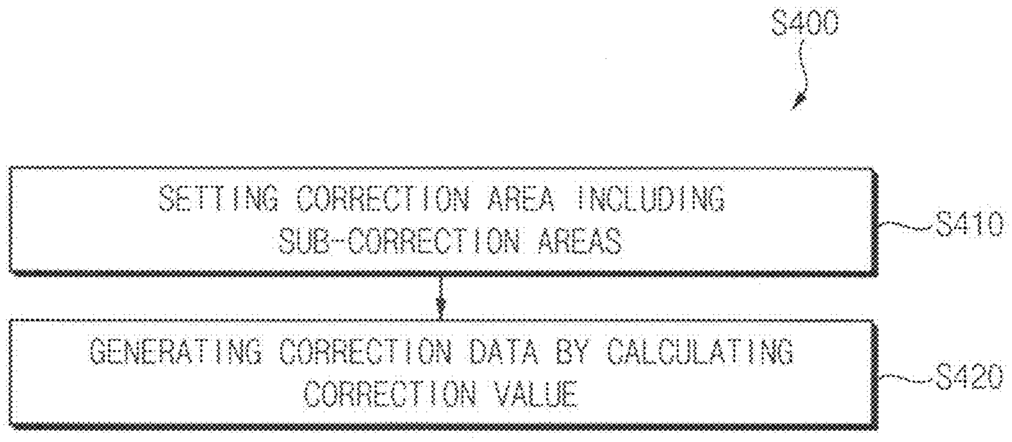
FIG. 10 is a flowchart illustrating a correction data generation step included in the test method of FIG. 6.

FIG. 10 is a flowchart illustrating a correction data generation step included in the test method of FIG. 6.

Referring to FIGS. 1, 2, 5, 6 and 10, the test method may set a correction area CA based on the second image data ID2 (S410). The correction area CA may include the boundary area BA.

The step of setting the correction area CA (S410) may use the area setter 126. The area setter 126 may set the sub-correction area SCA to correspond to each of boundary pixels BPX included in the boundary area BA. The correction area CA may include the sub-correction areas SCA corresponding to the boundary pixels BPX.

A position of the sub-correction area SCA may be set based on a position of each of the boundary pixels BPX. Also, an area of the sub-correction area SCA may be set based on an area of each of the boundary pixels BPX. For example, the boundary pixels BPX may include a red pixel, a green pixel, and a blue pixel. A red sub-correction area, a green sub-correction area, and a blue sub-correction area may be set to correspond to the red pixel, the green pixel, and the blue pixel, respectively. Each of the red sub-correction area, the green sub-correction area, and the blue sub-correction area may have different positions according to the respective positions of the boundary pixels BPX. Also, each of the red sub-correction area, the green sub-correction area, and the blue sub-correction area may have a different area according to the area of each of the boundary pixels BPX. However, the present inventive concept is not limited thereto, and the sub-correction areas SCA may have the same location and/or area.

The test method may generate correction data CID for the correction area CA (S420). In the step of generating the correction data CID (S420), the calculator 128 may be used. In the step of generating the correction data CID (S420), a correction value for each of the sub-correction areas SCA may be calculated. Accordingly, the correction values for the different sub-correction areas SCA may be different from each other. In the step of generating the correction data CID (S420), the correction data CID may be generated based on the correction values (S400).

In an embodiment, the test apparatus 100 may generate the correction data CID according to the test method. The correction data CID may be applied to the display panel 200, and spots of the display panel 200 may be removed by applying the correction data CID to the display panel 200. Accordingly, the image quality of the display panel 200 may be improved.

Figure 11:
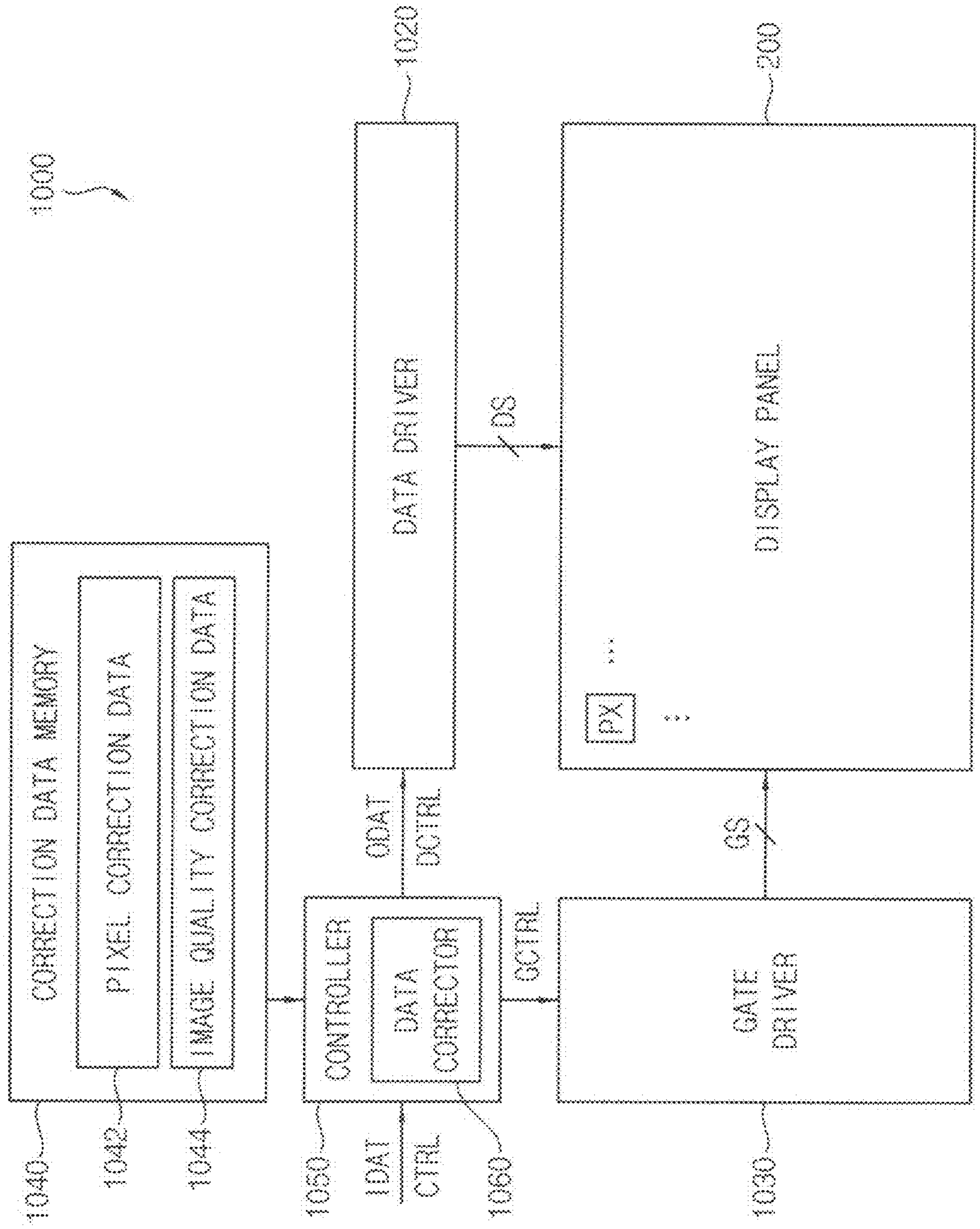
FIG. 11 is a block diagram illustrating a display device according to embodiments of the present inventive concept.
Figure 12:
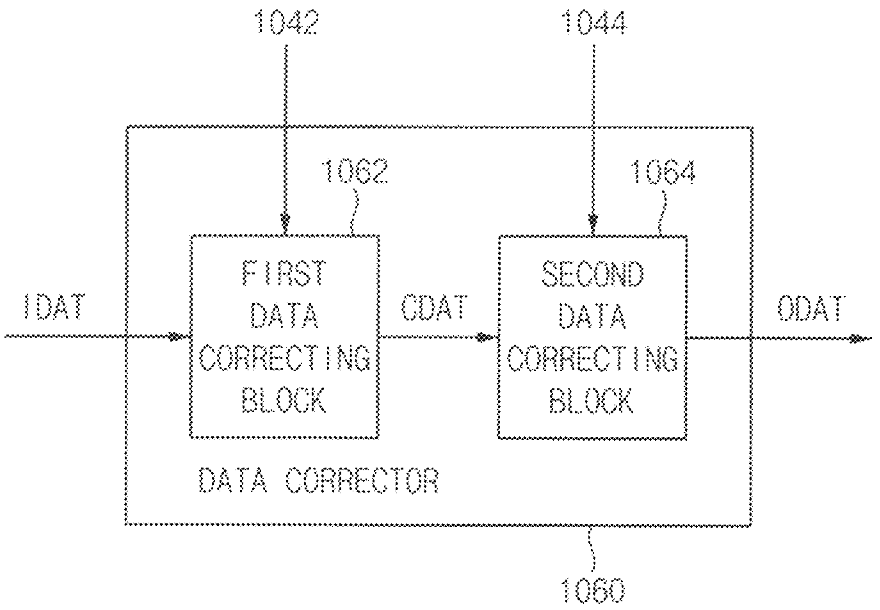
FIG. 12 is a block diagram illustrating an example of a data corrector included in the display device of FIG. 11.

FIG. 11 is a block diagram illustrating a display device according to embodiments of the present inventive concept. FIG. 12 is a block diagram illustrating an example of a data corrector included in the display device of FIG. 11.

Referring to FIG. 11, a display device 1000 according to an embodiment may include a display panel 200, a data driver 1020, a gate driver 1030, a correction data memory 1040, and a controller 1050.

The display panel 200 may include a plurality of pixels PX. The data driver 1020 may provide data signals DS to the pixels PX. The gate driver 1030 may provide gate signals GS to the pixels PX. The correction data memory 1040 may store pixel correction data 1042 and image quality correction data 1044. The controller 1050 may control an operation of the display device 1000. The controller 1050 may include a data corrector 1060.

The display panel 200 may include a plurality of data lines, a plurality of gate lines, and the pixels PX connected to the plurality of data lines and the plurality of gate lines. In an embodiment, each pixel PX may include an organic light emitting diode (OLED), at least one capacitor, and at least two transistors. The display panel 200 may be an OLED display panel. However, the display panel 200 is not limited thereto, and may be any display panel.

The data driver 1020 may generate the data signals DS based on output image data ODAT and data control signal DCTRL received from the controller 1050, and may provide the data signals DS corresponding to the output image data ODAT to the pixels PX. For example, the data control signal DCTRL may include an output data enable signal, a horizontal start signal, and a load signal, but the prevent inventive concept is not limited thereto. The data driver 1020 may be implemented with one or more data integrated circuits (IC). In addition, the data driver 1020 may be mounted on the display panel 200 in a chip-on-glass (COG) method or connected to the display panel 200 in a chip-on-film (COF) method. In another embodiment, the data driver 1020 may be integrated in a peripheral portion of the display panel 200.

The gate driver 1030 may generate the gate signals GS based on the gate control signal GCTRL output from the controller 1050 and provide the gate signals GS to the pixels PX. The gate control signal GCTRL may include a frame start signal and a gate clock signal, but is not limited thereto. In an embodiment, the gate driver 1030 may be implemented as an amorphous silicon gate (ASG) driver integrated in the peripheral portion of the display panel 200. In another embodiment, the gate driver 1030 may be implemented with one or more gate ICs. Also, according to an embodiment, the gate driver 1030 may be mounted on the display panel 200 in the COG method or may be connected to the display panel 200 in the COF method.

Referring further to FIG. 11, the correction data memory 1040 may store the pixel correction data 1042 and the image quality correction data 1044. The pixel correction data 1042 may be generated by performing spot correction on the pixels PX included in the display panel 200. Also, the image quality correction data 1044 may be generated by performing image quality correction on the entire display panel 200.

For example, the pixel correction data 1042 may be the correction data CID generated by the spot corrector 120 of FIG. 1. The image quality correction data 1044 may be the image quality correction data generated by the image quality corrector 130 of FIG. 1.

In an embodiment, the pixel correction data 1042 may be data for correcting each of the boundary pixels (e.g. the boundary pixels BPX of FIG. 5) positioned in a boundary of a preset area (e.g. the spot area SA of FIG. 3) among pixels PX included in the display panel 200. The preset area may be an area determined to be a spot area when the test process including the spot correction and the image quality correction for the display panel 200 is performed.

The pixel correction data 1042 may be a set of correction data for each of the pixels PX positioned in the boundary of the preset area. The image quality correction data 1044 may be data for correcting the entire display panel 200. Accordingly, the pixel correction data 1042 may be correction data for removing the spot of the display panel 200, and the image quality correction data 1042 may be correction data for uniformly correcting the image quality of the entire display panel 200.

The controller (e.g., a timing controller (T-CON)) 1050 may receive input image data IDAT and a control signal CTRL from an external host. In an embodiment, the control signal CTRL may include a vertical synchronization signal, a horizontal synchronization signal, an input data enable signal, a master clock signal, and the like, but the present inventive concept is not limited thereto. The controller 1050 may generate the output image data ODAT, the data control signal DCTRL, and the gate control signal GCTRL based on the input image data IDAT and the control signal CTRL. The controller 1050 may control an operation of the data driver 1020 by providing the output image data ODAT and the data control signal DCTRL to the data driver 1020. The controller 1050 may control an operation of the gate driver 1030 by providing the gate control signal GCTRL to the gate driver 1030.

The controller 1050 may include the data corrector 1060. The data corrector 1060 may correct the input image data IDAT based on the pixel correction data 1042 and the image quality correction data 1044. The data corrector 1060 may generate the output image data ODAT by correcting the input image data IDAT.

In an embodiment, as disclosed in FIG. 12, the data corrector 1060 may include the first data correcting block 1062 and the second data correcting block 1064. The first data correcting block 1062 may receive the pixel correction data 1042 from the correction data memory 1040. The first data correcting block 1062 may generate correction applied data CDAT by adding the pixel correction data 1042 to the input image data IDAT. The second data correcting block 1064 may receive the image quality correction data 1044 from the correction data memory 1040. The second data correcting block 1064 may generate the output image data ODAT by adding the image quality correction data 1044 to the correction applied data CDAT.

Meanwhile, although FIG. 12 illustrates an example in which the pixel correction data 1042 and the image quality correction data 1044 are added to the input image data IDAT in the order, the present inventive concept is not limited thereto. Accordingly, in another embodiment, the image quality correction data 1044 and the pixel correction data 1042 may be added to the input image data IDAT in the order. In further another embodiment, the pixel correction data 1042 and the image quality correction data 1044 may be simultaneously added to the input image data IDAT. That is, the spot correction (e.g., correction for each of the pixels PX) and the image quality correction for the display panel 200 may be simultaneously performed.

As described above, the display device 1000 according to embodiments may store the pixel correction data 1042 and the image quality correction data 1044. The display device 1000 may correct the input image data IDAT based on the pixel correction data 1042 and the image quality correction data 1044. Accordingly, the spots of the display panel 200 included in the display device 1000 may be removed, and the image quality may be improved.

The test method, the test apparatus, and the display device according to the embodiments may be applied to a display device included in a computer, a notebook, a mobile phone, a smartphone, a smart pad, a PMP, a PDA, an MP3 player, or the like.

Although test method, the test apparatus, and the display device according to the embodiments have been described with reference to the drawings, the illustrated embodiments are examples, and may be modified and changed by a person having ordinary knowledge in the relevant technical field without departing from the technical spirit described in the following claims.

What is claimed is:

1. A test method comprising:

generating first image data by imaging a display panel including pixels;

generating boundary data by detecting a spot area in the display panel based on the first image data;

generating second image data by deblurring the first image data with respect to a boundary area disposed at a boundary of the spot area based on the boundary data; and generating correction data by setting a correction area including the boundary area based on the second image data.

2. The test method of claim 1, wherein the generating the first image data includes performing a boundary image processing on a captured initial image data.

3. The test method of claim 1, wherein the generating the boundary data includes obtaining a luminance profile of the display panel along a direction perpendicular to an extension direction of the spot area.

4. The test method of claim 3, wherein the generating the boundary data includes obtaining a change amount of the luminance profile based on the luminance profile.

5. The test method of claim 4, wherein the generating the boundary data includes detecting the boundary of the spot area based on the change amount of the luminance profile.

6. The test method of claim 1, wherein the display panel further includes a non-boundary area disposed adjacent to the boundary area.

7. The test method of claim 6, wherein the generating the second image data further includes blurring the first image data with respect to the non-boundary area based on the boundary data.

8. The test method of claim 1, wherein the pixels are positioned in the correction area and include boundary pixels disposed in the boundary area, and the correction area includes a sub-correction area corresponding to each of the boundary pixels.

9. The test method of claim 8, wherein the generating the correction data includes calculating a correction value corresponding to the sub-correction area.

* * * * *